US009168763B2

(12) United States Patent
Ota et al.

(10) Patent No.: US 9,168,763 B2
(45) Date of Patent: Oct. 27, 2015

(54) RECORDING APPARATUS

(75) Inventors: Miho Ota, Shiojiri (JP); Mikio Kitagishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 265 days.

(21) Appl. No.: 13/549,778

(22) Filed: Jul. 16, 2012

(65) Prior Publication Data

US 2013/0021417 A1 Jan. 24, 2013

(30) Foreign Application Priority Data

Jul. 21, 2011 (JP) ................................ 2011-159631

(51) Int. Cl.

| | |
|---|---|
| ***B41J 2/175*** | (2006.01) |
| ***G03B 15/14*** | (2006.01) |
| ***B41J 29/13*** | (2006.01) |
| ***B41J 11/00*** | (2006.01) |
| ***B41J 29/377*** | (2006.01) |

(52) U.S. Cl.

CPC .............. *B41J 11/001* (2013.01); *B41J 11/002* (2013.01); *B41J 11/0085* (2013.01); *B41J 29/377* (2013.01)

(58) Field of Classification Search

CPC .............................. B41J 11/002; B41J 11/007
USPC .......... 399/92, 94, 106, 111; 347/26, 86, 126, 347/206
See application file for complete search history.

(56) References Cited

U.S. PATENT DOCUMENTS

| | | | | |
|---|---|---|---|---|
| 5,887,226 | A * | 3/1999 | Taki | 399/92 |
| 6,714,229 | B2 * | 3/2004 | Miyazaki et al. | 347/223 |
| 6,882,809 | B2 * | 4/2005 | Hirose et al. | 399/92 |
| 7,236,716 | B2 * | 6/2007 | Ishino et al. | 399/94 |
| 7,458,677 | B2 * | 12/2008 | Morris et al. | 347/108 |
| 7,469,112 | B2 * | 12/2008 | Yuasa | 399/92 |
| 7,758,179 | B2 * | 7/2010 | Niekawa | 347/102 |
| 2006/0002732 | A1 * | 1/2006 | Hwang et al. | 399/88 |
| 2007/0071485 | A1 * | 3/2007 | Yuasa | 399/92 |
| 2008/0079795 | A1 * | 4/2008 | Nakazawa | 347/102 |
| 2009/0035009 | A1 * | 2/2009 | Ohkura | 399/94 |
| 2009/0244231 | A1 | 10/2009 | Tsuji et al. | |
| 2011/0116826 | A1 * | 5/2011 | Nishikawa | 399/92 |
| 2012/0183314 | A1 * | 7/2012 | Nishino et al. | 399/44 |

FOREIGN PATENT DOCUMENTS

| | | |
|---|---|---|
| JP | 2009-233876 | 10/2009 |
| JP | 2010-173256 | 8/2010 |
| JP | 2010-188624 | 9/2010 |
| JP | 2011-073275 | 4/2011 |

* cited by examiner

*Primary Examiner* — Matthew Luu
*Assistant Examiner* — Patrick King
(74) *Attorney, Agent, or Firm* — Workman Nydegger

(57) ABSTRACT

A recording apparatus includes: a holding unit that holds a liquid receptacle containing a liquid; a recording head that ejects, onto a recording medium, the liquid supplied from the liquid receptacle held by the holding unit; a heating unit that heats the recording medium; and a suction unit that includes a suction port for sucking air to the heating unit. Here, the suction port is disposed in a location that enables the atmosphere around the liquid receptacle to be sucked.

12 Claims, 9 Drawing Sheets

RECORDING APPARATUS

BACKGROUND

1. Technical Field

The present invention relates to recording apparatuses.

2. Related Art

Ink jet printers are known as an example of a recording apparatus that records images, text, or the like by ejecting a fluid onto a recording medium. In the case where an ink (fluid) that requires penetration drying, evaporation drying, or the like is used in such an ink jet printer, it is necessary to provide a heating device as a drying unit for drying the ink that has been ejected onto the recording medium.

An ink jet printer having a structure in which ink is supplied to a recording head from an ink cartridge is known as this type of recording apparatus (for example, see JP-A-2010-188624). With such an ink jet printer, it is necessary to prevent the temperature of the ink within the ink cartridge from rising in order to maintain stable ink ejection properties. Accordingly, a configuration in which the heating device and the ink cartridge are disposed as far away from each other as possible, and in which the ink cartridge is inserted into/removed from the rear surface side of the main body of the printer, is employed.

However, in the stated past technique, because the ink cartridge is disposed at a distance from the heating device, it is not possible to employ a layout that conserves space. Furthermore, there is a problem in that it is necessary to carry out operations for replacing the ink cartridge from the rear surface side of the printer, which is inconvenient in terms of maintenance operations.

SUMMARY

It is an advantage of some aspects of the invention to provide a recording apparatus capable of preventing a rise in the temperature of ink and whose layout conserves space, and that has superior maintainability.

A recording apparatus according to an aspect of the invention includes: a holding unit that holds a liquid receptacle containing a liquid; a recording head that ejects, onto a recording medium, the liquid supplied from the liquid receptacle held by the holding unit; a heating unit that heats the recording medium; and a suction unit that includes a suction port for sucking air provided in the heating unit. Here, the suction port is disposed in a location that enables the atmosphere around the liquid receptacle to be sucked.

With the recording apparatus according to this aspect of the invention, air flow is produced in the periphery of the liquid receptacle by the suction port sucking the surrounding atmosphere of the liquid receptacle, which makes it possible to prevent the air heated by the heating unit from building up around the liquid receptacle. Through this, the influence of heat from the heating unit on the liquid receptacle can be reduced.

Accordingly, a configuration in which the heating unit and the holding unit are disposed near each other can be employed, which makes it possible to conserve space in the layout. Furthermore, because no restrictions are placed on the location in which the holding unit is disposed relative to the heating unit, a configuration in which the holding unit is disposed in a desired location can be employed, which makes it possible to provide a recording apparatus having superior maintainability.

In the stated recording apparatus, it is preferable for the heating unit to include a box-shaped portion, and for the suction port to be located in a surface of the box-shaped portion that is close to the holding unit.

According to this configuration, the suction port is disposed in a side surface of the box-shaped portion that configures the heating unit that is near the holding unit, and thus the surrounding atmosphere of the liquid receptacle can be sucked.

In the stated recording apparatus, it is preferable for the holding unit to include, in a side surface of the holding unit, an opening portion that enables the liquid receptacle to be inserted into/removed from the holding unit, and for the suction port to be disposed in a side surface of the box-shaped portion that is close to the opening portion.

According to this configuration, the opening portion that enables the liquid receptacle to be inserted into/removed from the holding unit is provided in a side surface of the holding unit and the suction port is disposed in a side surface that is near the opening portion, and thus air can also be sucked from the gap between the liquid receptacle and the holding unit via the opening portion. Accordingly, an air flow can be produced along the insertion/removal direction of the liquid receptacle, and thus the influence of heat produced by the heating unit on the liquid receptacle can be suppressed with certainty.

In the stated recording apparatus, it is preferable for the heating unit to heat the recording medium that has been transported from upstream and onto which the liquid has been ejected by the recording head, and for the holding unit to be disposed to the side of the heating unit in the direction orthogonal to the direction in which the recording medium is transported.

According to this configuration, in the case where the direction in which the recording medium is discharged is toward the front of the recording apparatus, the opening portion of the holding unit for the liquid receptacle is also disposed on the front surface of the recording apparatus, and thus operations for replacing the liquid receptacle can be carried out from the front side of the recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
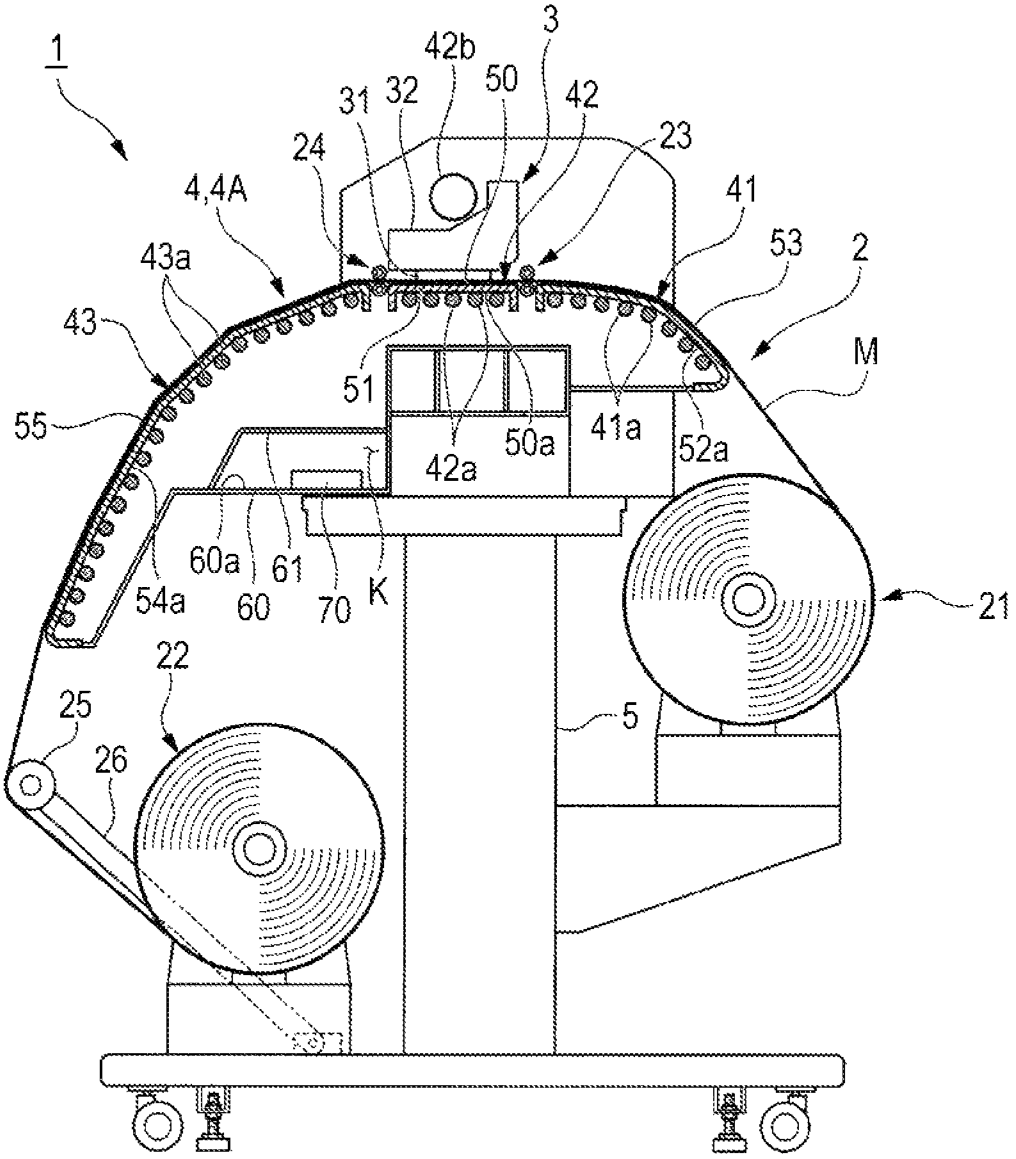
FIG. 1 is a schematic diagram illustrating a printer according to an embodiment of the invention.

An embodiment of a recording apparatus according to the invention will be described hereinafter with reference to the drawings. It should be noted that in the drawings used in the following descriptions, the scale of the various constituent elements has been changed in order to achieve sizes that are more visibly recognizable. In this embodiment, an ink jet printer (called simply a "printer" hereinafter) will be given as an example of a recording apparatus according to the invention.

FIG. 1 is a schematic diagram illustrating a printer 1 according to an embodiment of the invention.

The printer 1 is a large-format printer (LFP) that handles a comparatively large-size medium (recording medium) M. The medium M according to this embodiment is formed of, for example, a vinyl chloride film having a width of approximately 64 inches.

As shown in FIG. 1, the printer 1 includes a transport unit 2, a recording unit 3, and a heating unit 4, where the transport unit 2 transports the medium M using a roll-to-roll system, the recording unit 3 records images, text, or the like onto the medium M by ejecting ink (a fluid) thereon, and the heating unit 4 heats the medium M. These constituent elements are supported by a main body frame 5. In addition, the printer 1 includes a control unit (not shown) that controls the driving of the various members mentioned above.

The transport unit 2 includes a roll 21 that feeds out the medium M in roll form from a roll member R and a roll 22 that takes up the medium M that has been fed out. The transport unit 2 includes, in a transport path between the roll 21 and the roll 22, transport roller pairs 23 and 24 that transport the medium M. In addition, the transport unit 2 includes, in the transport path between the transport roller pair 24 and the roll 22, a tension roller 25 that imparts tension on the medium M.

The tension roller 25 is supported by a pivoting frame 26, and the configuration is such that the tension roller 25 makes contact with the rear surface of the medium M along the width direction thereof (that is, the vertical direction as seen in FIG. 1). The tension roller 25 is formed so as to be longer in the width direction than the width of the medium M. The tension roller 25 is provided downstream, in a transport direction, from an after-heater unit 43 of the heating unit 4, which will be mentioned later.

The recording unit 3 includes an ink jet head (recording head) 31 that ejects ink (a fluid) onto the medium M in the transport path between the transport roller pairs 23 and 24, and a carriage 32 in which the ink jet head 31 is mounted and that is capable of moving back and forth in the width direction. The ink jet head 31 includes a plurality of nozzles, and is configured so as to be capable of ejecting ink that requires penetration drying, evaporation drying, or the like, selected based on the medium M. Note that the ink jet head 31 is supplied with ink from ink cartridges attached to a cartridge holding unit 100, which will be mentioned later.

The heating unit 4 has a configuration that increases the image quality by quickly drying and fixing the ink on the medium M by heating the medium M, thus preventing bleeding, smearing, or the like. The heating unit 4 includes a support surface that configures part of the transport path for the medium M, and is configured so as to support the medium M in a curved state that bulges upward between the rolls 21 and 22 and heat the medium M on that support surface.

The heating unit 4 has a box-shaped portion 4A, and the outer form thereof is defined by the box-shaped portion 4A. The box-shaped portion 4A has a first support member 51, a second support member 53, a third support member 55, and a main body unit 60. The first support member 51, the second support member 53, and the third support member 55 are each capable of being attached to/removed from the main body unit 60. The heating unit 4 is attached to the main body frame 5 via the main body unit 60.

The heating unit 4 includes: a pre-heater unit 41 that preheats the medium M upstream, in the transport direction, from the position where the recording unit 3 is provided; a platen heater unit 42 that heats the medium M at a position that opposes the recording unit 3; and the after-heater unit 43 that heats the medium M downstream, in the transport direction, from the position where the recording unit 3 is provided.

In this embodiment, the heating temperature of a heater **41*a* in the pre-heater unit 41 is set to 40° C. Meanwhile, in this embodiment, the heating temperature of a heater 42*a* in the platen heater unit 42 is set to the same 40° C. (target temperature) as the heater 41*a*. Furthermore, in this embodiment, the heating temperature of a heater 43*a* in the after-heater unit 43 is set to 50° C., a higher temperature than that of the heaters 41*a* and 42*a***.

The pre-heater unit 41 is configured so as to quickly prompt the drying of the ink when the ink has landed by gradually increasing the temperature of the medium M from a normal temperature to the target temperature (the temperature of the platen heater unit 42). Meanwhile, the platen heater unit 42 is configured so as to quickly instigate the drying of the ink when the ink has landed by ensuring that the ink lands on the medium M in a state in which the medium M is kept at the target temperature.

The after-heater unit 43, meanwhile, is configured so as to cause the medium M to rise to a temperature that is higher than the target temperature, quickly dry any ink that has landed on the medium M but has not yet been dried, and completely dry and fix the ink that has landed on the medium M at least before the medium M is taken up on the roll 22.

In the after-heater unit 43, the heating temperature is, as mentioned earlier, set to be higher than the other heater units, and thus it is easier for the medium M to experience thermal stretching there than in the other heater units. Furthermore, in the after-heater unit 43, tension is applied to the medium M by the tension roller 25, and thus the thermal stretching in the medium M appears as twisting in the central area in the width direction thereof, which makes it easy for wrinkles to appear.

Figure 2:
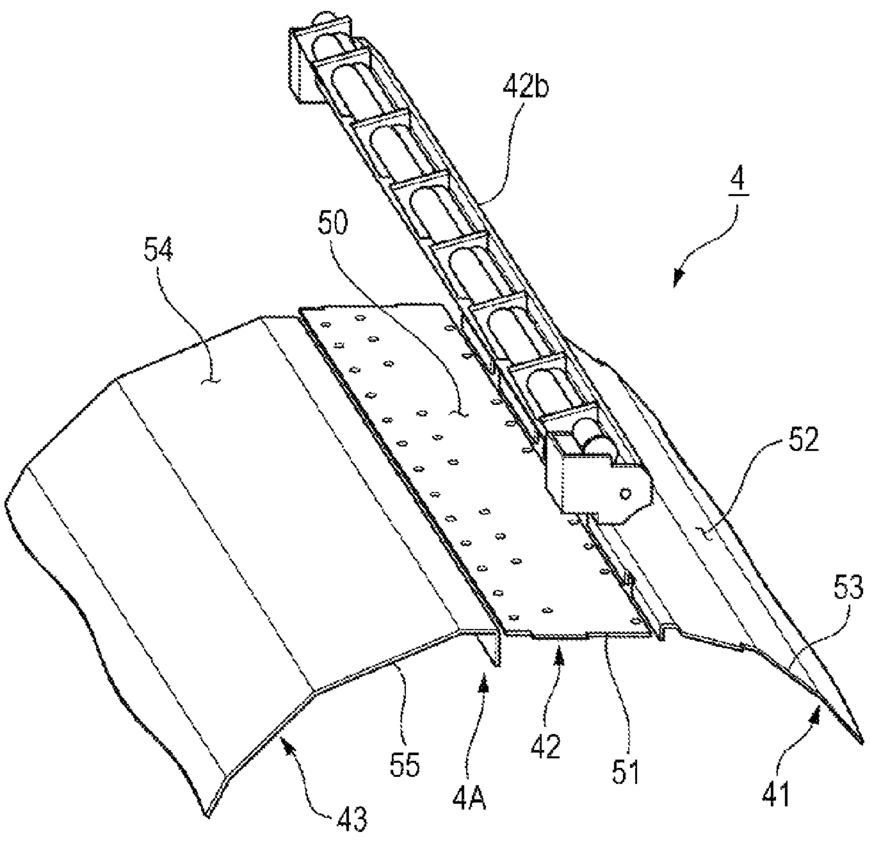
FIG. 2 is a diagram illustrating the primary constituent elements of a heating unit according to an embodiment of the invention.
Figure 3:
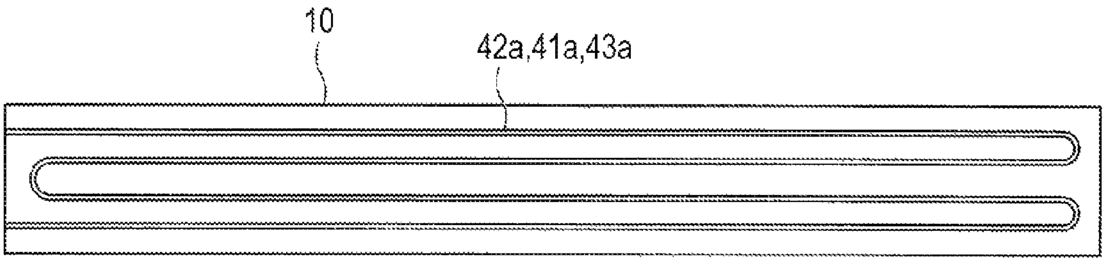
FIG. 3 is a diagram illustrating the configuration of a heater.

FIG. 2 is a diagram illustrating the primary constituent elements of the heating unit 4. FIG. 3 is a diagram illustrating the configuration of a heater.

As shown in FIG. 2, the platen heater unit 42 includes the stated first support member 51, which configures a support surface 50 that supports the medium M. The first support member 51 is formed of a metal material such as Al, SUS, or the like. The first support member 51 according to this embodiment is formed of Al. The first support member 51 is a plate-shaped member that is longer in the width direction than the width of the medium M, and to be more specific, is longer than a width of approximately 64 inches.

As shown in FIG. 3, the heater **42*a* is wired on a surface 50*a* on the opposite side as the support surface 50 of the first support member 51. The heater 42*a* is a tube heater, and is affixed to the surface 50*a* on the opposite side as the support surface 50 of the first support member 51 via aluminum tape 10. Accordingly, the heater 42*a* is configured so as to carry out thermal-conductive heating of the first support member 51 through thermal conduction from the surface 50*a* on the opposite side as the support surface 50, thus indirectly heating the medium M supported on the support surface 50 by heating the support surface 50**.

The pre-heater unit 41 has the stated second support member 53, which configures a support surface 52 that first supports the medium M that has been fed out from the roll 22. The second support member 53 is formed of a metal material such as Al, SUS, or the like. The second support member 53 according to this embodiment is formed of Al. The second support member 53 has the same plate shape as the first support member 51. Meanwhile, as shown in FIG. 1, the heater 41*a* is wired on a surface 52*a* on the opposite side as the support surface 52. The heater 41*a* has the same configuration as the stated heater 42*a* shown in FIG. 3, and is configured as a tube heater; the heater 41*a* is affixed to the surface 52*a* on the opposite side as the support surface 52 of the second support member 53 via aluminum tape 10.

Meanwhile, the after-heater unit 43 has the stated third support member 55, which configures a support surface 54 that supports the medium M that has passed the first support member 51. The third support member 55 is formed of a metal material such as Al, SUS, or the like. The third support member 55 according to this embodiment is formed of Al. The third support member 55 has the same plate shape as the first support member 51 and the second support member 53. Meanwhile, as shown in FIG. 1, the heater 43*a* is wired on a surface 54*a* on the opposite side as the support surface 54. The heater 43*a* has the same configuration as the stated heaters 41*a* and 42*a* shown in FIG. 3, and is configured as a tube heater; the heater 43*a* is affixed to the surface 54*a* on the opposite side as the support surface 54 of the third support member 55 via aluminum tape 10.

The printer 1 includes a heater control board (control unit) 70 that controls the driving of the heaters 41*a*, 42*a*, and 43*a* in the heating unit 4. The heater control board 70 is housed within a housing space K defined by a partition plate (plate member) 61 provided within the box-shaped portion 4A of the heating unit 4 and the main body unit 60. The partition plate 61 is formed of a metal material such as Al, SUS, or the like. In this embodiment, the partition plate 61 is formed of Al.

The housing space K is formed in an inner space created between the after-heater unit 43 and the main body unit 60. The heater control board 70 is disposed on a flat portion provided on a bottom surface 60*a* of the main body unit 60, and is housed within the housing space K having been covered by the stated partition plate 61. In other words, the partition plate 61 configures the housing space K with the main body unit 60, which is a different entity than the first support member 51, the second support member 53, and the third support member 55 that respectively configure the support surfaces 50, 52, and 54 for the medium M. Note that the partition plate 61 is configured so as to be removable from the main body unit 60.

Figure 4A:
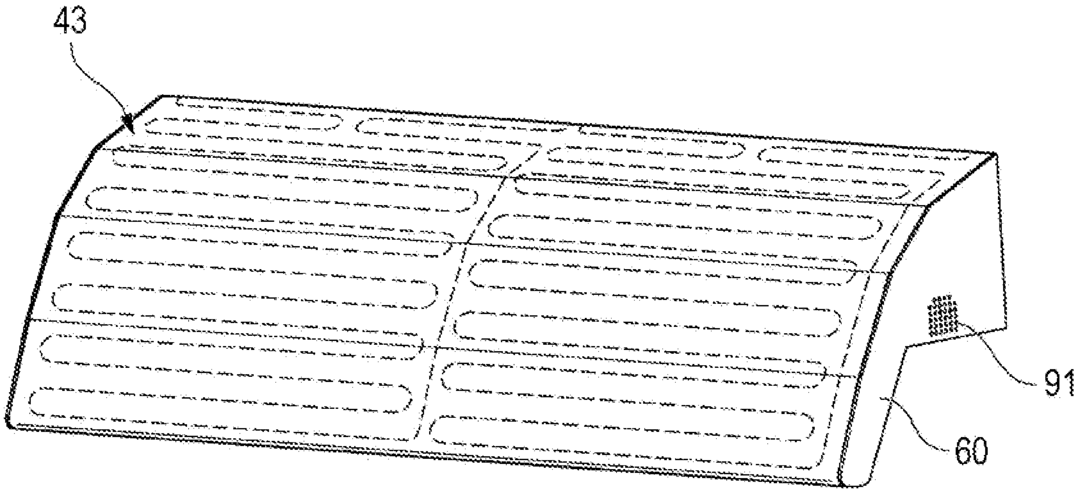
FIG. 4A is a diagram illustrating a state in which an after-heater unit has been attached to a main body unit.
Figure 4B:
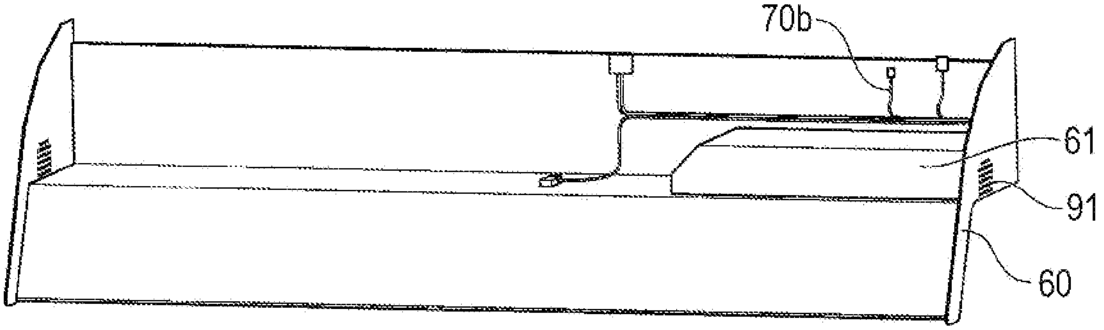
FIG. 4B is a diagram illustrating a state in which an after-heater unit has been attached to a main body unit.
Figure 5:
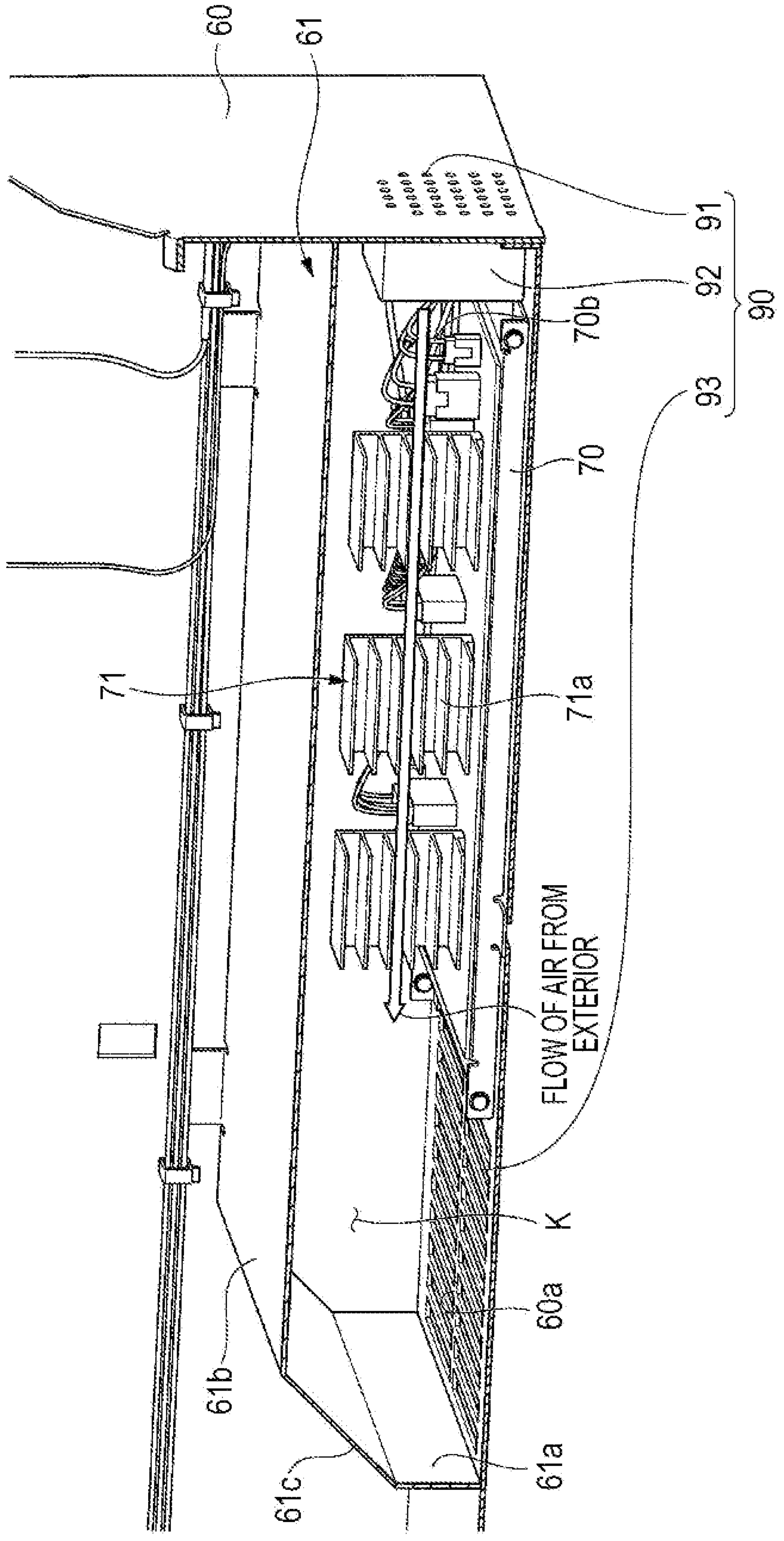
FIG. 5 is a diagram illustrating a state within a housing space.

FIGS. 4A and 4B are perspective views illustrating the printer 1 from the front side, where FIG. 4A is a diagram illustrating a state in which the after-heater unit 43 is attached to the main body unit 60 and FIG. 4B is a diagram illustrating a state in which the after-heater unit 43 has been removed from the main body unit 60. FIG. 5, meanwhile, is a diagram illustrating the interior of the housing space K, with part of the after-heater unit 43 (the third support member 55) attached to the main body unit 60 illustrated as being cut out.

As shown in FIGS. 4A and 4B, the printer 1 allows the partition plate 61 to be accessed from the front when the after-heater unit 43 (the third support member 55) is removed from the main body unit 60. This is because the partition plate 61 configures the stated housing space K with the main body unit 60, which is a different entity than the third support member 55 that configures the support surface 54 for the medium M.

The partition plate 61 is, as stated above, removable from the main body unit 60. FIG. 5 is a diagram illustrating a state in which the partition plate 61 has been removed from the main body unit 60. As shown in FIG. 5, the heater control board 70 includes a circuit unit (not shown) in which transistors or the like are formed, and a plurality of wires 70*b* that are electrically connected to the circuit unit are led out. These wires 70*b* control the driving of the heaters 41*a*, 42*a*, and 43*a* by being respectively connected thereto. Because the heater control board 70 is disposed internally (in the housing space K) in this manner, the heater control board 70 and the heaters 41*a*, 42*a*, and 43*a* are disposed in the vicinity of each other.

As shown in FIG. 5, the printer 1 includes a suction/exhaust mechanism 90 that sucks air into the stated housing space K and exhausts air from the housing space K. The suction/exhaust mechanism 90 includes: an air suction port 91; a suction fan (cooling fan) 92 that sucks outside air into the housing space K via the air suction port 91; and an air exhaust port 93 that exhausts, to the exterior, the air sucked into the housing space K by the suction fan 92 via the air suction port 91. The air suction port 91 is formed in a side surface portion of the main body unit 60 that configures a side surface of the housing space K. The suction fan 92 is disposed within the housing space K so as to oppose the air suction port 91, and is capable of efficiently supplying air from the exterior to the interior via the air suction port 91. The air exhaust port 93 is formed in the bottom surface 60*a* of the main body unit 60 that is further from the air suction port 91 than the heater control board 70. As a result, the air supplied to the interior of the housing space K from the air suction port 91 passes the heater control board 70 and is then exhausted from the air exhaust port 93. Accordingly, the heater control board 70 is cooled by the air supplied to the interior of the housing space K via the air suction port 91.

The partition plate 61 includes: a rising portion 61*a* that rises vertically relative to the bottom surface 60*a* of the main body unit 60; an upper plate portion 61*b* that extends parallel to the bottom surface 60*a*; and a connection portion 61*c* that connects the rising portion 61*a* and the upper plate portion 61*b*. The connection portion 61*c* is connected to the upper plate portion 61*b* so as to be angled toward the air suction port 91 relative to the rising portion 61*a*. Through this, the air that has been sucked in from the air suction port 91 and that flows within the housing space K can be effectively led to the air exhaust port 93 formed in the bottom surface 60*a* of the main body unit 60 by making contact with the connection portion 61*c*. As a result, the air that has been sucked into the housing space K can be efficiently exhausted from the air exhaust port 93. Note that the rising portion 61*a*, the upper plate portion 61*b*, and the connection portion 61*c* are connected to the main body unit 60 in the depth direction and the forward direction in the drawings.

Heat dissipation members 71 are also provided in the heater control board 70. Each heat dissipation member 71 is configured from a finned structure having a plurality of fins. In this embodiment, three heat dissipation members 71 are attached to the heater control board 70.

A plurality of fins 71*a* that configure each heat dissipation member 71 are disposed following the direction that intersects with the direction in which the exterior air (gas) taken in from the air suction port 91 flows, and more specifically, in the direction orthogonal to that direction. Through this, the flow of the exterior air taken in from the air suction port 91 is prevented from being inhibited by the fins 71*a*.

Figure 6:
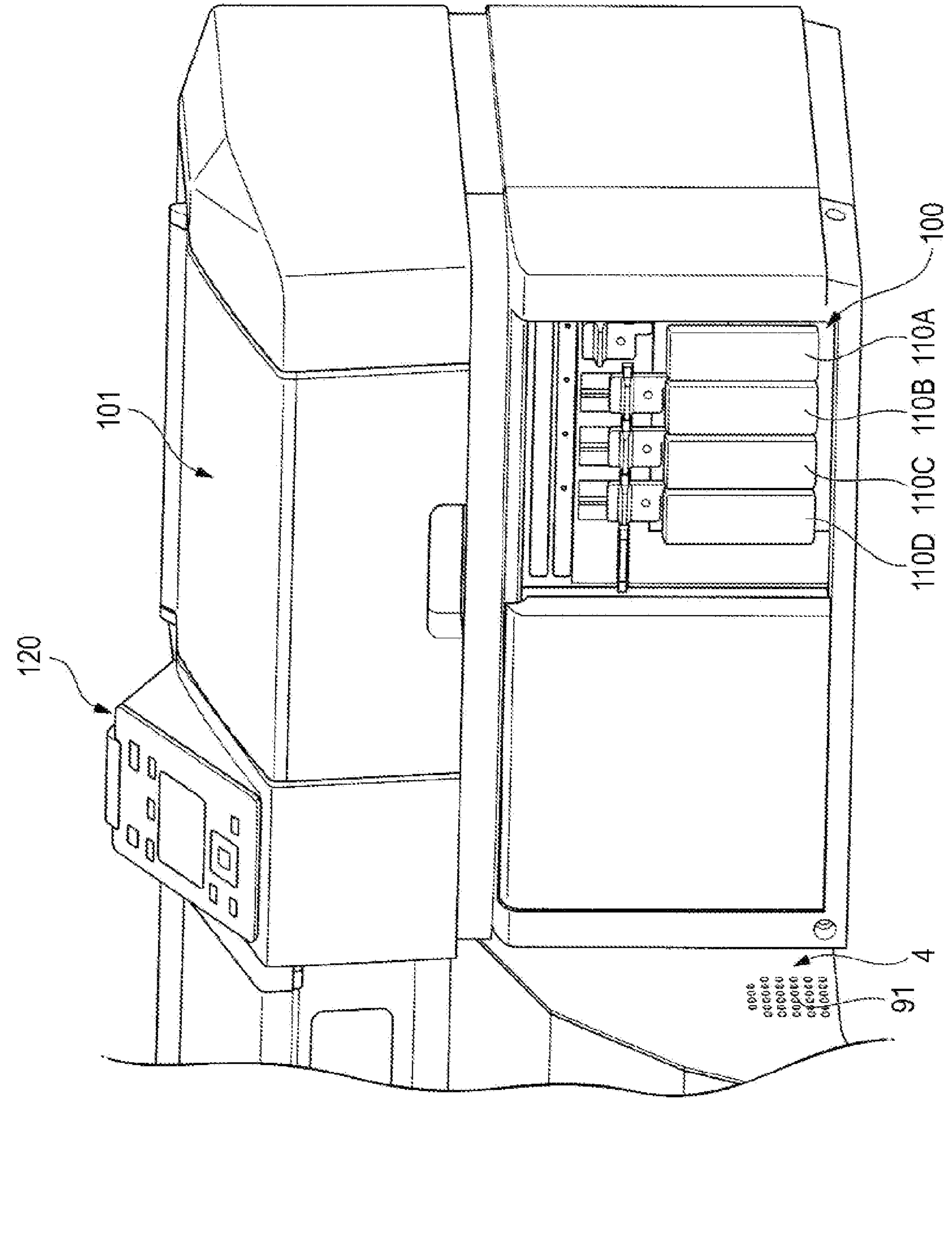
FIG. 6 is a perspective view illustrating the configuration of a printer.

FIG. 6 is a perspective view illustrating the configuration of the printer 1. As shown in FIG. 6, the printer 1 includes the cartridge holding unit (holding unit) 100 disposed in the vicinity of the heating unit 4. The cartridge holding unit 100 according to this embodiment holds, for example, four ink cartridges (liquid receptacles) 110A to 110D.

The ink cartridges 110A to 110D hold inks of different colors (for example, yellow, magenta, cyan, black, or the like). The ink cartridges 110A to 110D supply the ink to the ink jet head 31 mounted in the carriage 32 via ink tubes (not shown) by being attached to the cartridge holding unit 100.

Figure 7:
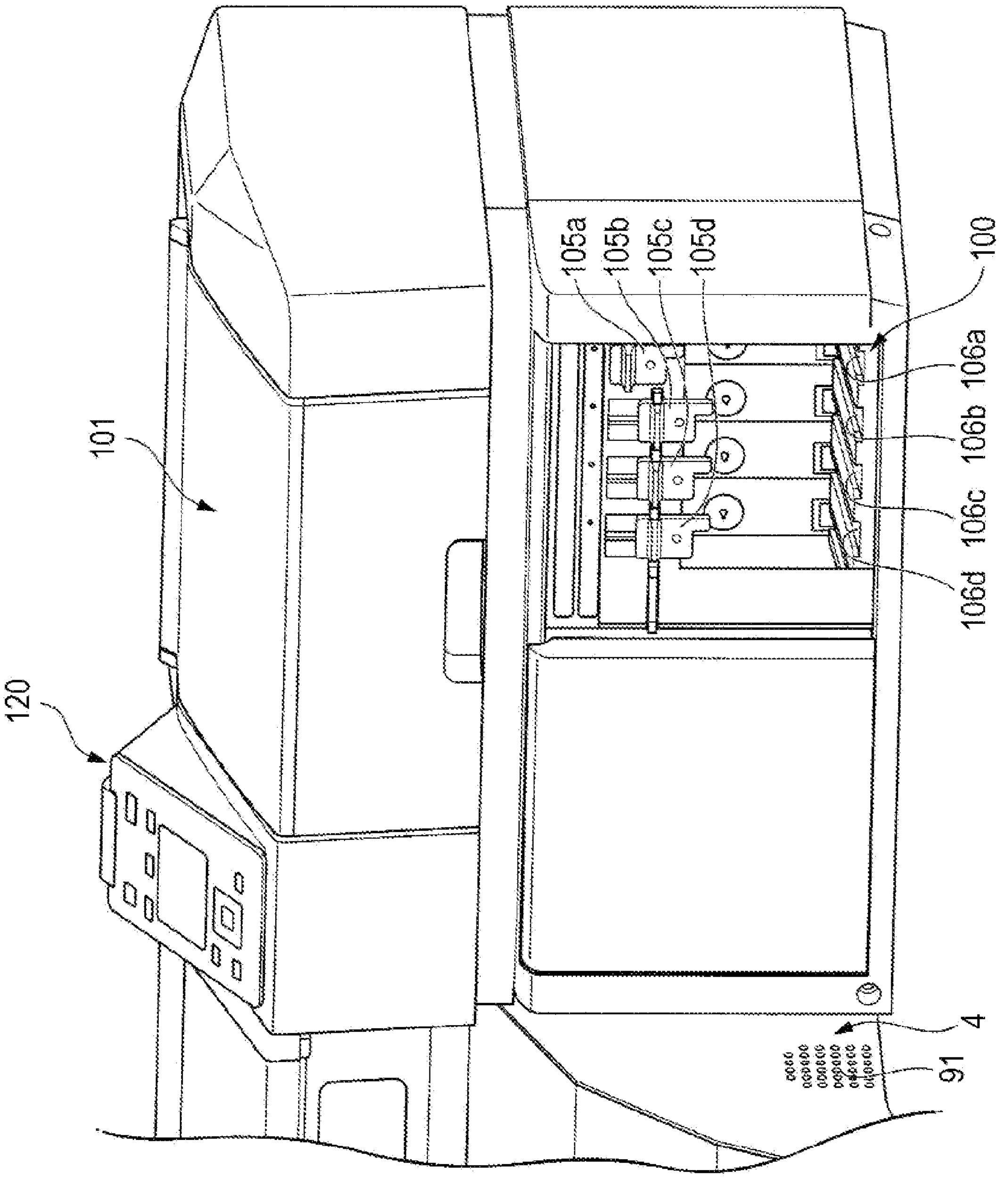
FIG. 7 is a diagram illustrating the primary constituent elements of a cartridge holding unit.

FIG. 7 is a diagram illustrating the primary constituent elements of the cartridge holding unit 100, and more specifically, illustrating a state in which the ink cartridges 110A to 110D have been removed. As shown in FIG. 7, the respective ink cartridges 110A to 110D can be inserted into/removed from the cartridge holding unit 100. The cartridge holding unit 100 includes engagement portions 105*a* to 105*d* that engage with and hold the respective inserted ink cartridges 110A to 110D. Each of the engagement portions 105*a* to 105*d* corresponds to respective ink cartridges 110A to 110D.

Meanwhile, the cartridge holding unit 100 has guide grooves 106*a* to 106*d*, corresponding to the respective ink cartridges 110A to 110D, formed in the bottom surface thereof so as to follow the insertion/removal direction of the cartridges. The guide grooves 106*a* to 106*d* are for stably guiding the cartridges by guiding protrusions (not shown) formed in the ink cartridges 110A to 110D, respectively. Through this, the cartridge holding unit 100 makes it possible to carry out the operations for inserting/removing the ink cartridges 110A to 110D in a stable manner.

The guide grooves 106*a* to 106*d* are configured so as to produce gaps between the cartridges 110A to 110D when the ink cartridges 110A to 110D are housed within the cartridge holding unit 100.

Returning to FIG. 6, a maintenance cover 101 is provided in an upper area of the cartridge holding unit 100. Furthermore, an input unit 120 for inputting predetermined information to the printer 1 is provided in the vicinity of the maintenance cover 101.

The maintenance cover 101 is used when performing maintenance on the printer 1. When the maintenance cover 101 is opened during maintenance, the carriage 32 in which the ink jet head 31 is mounted is disposed in the interior. Through this, a user can easily carry out maintenance operations on the ink jet head 31 and the carriage 32.

Figure 8:
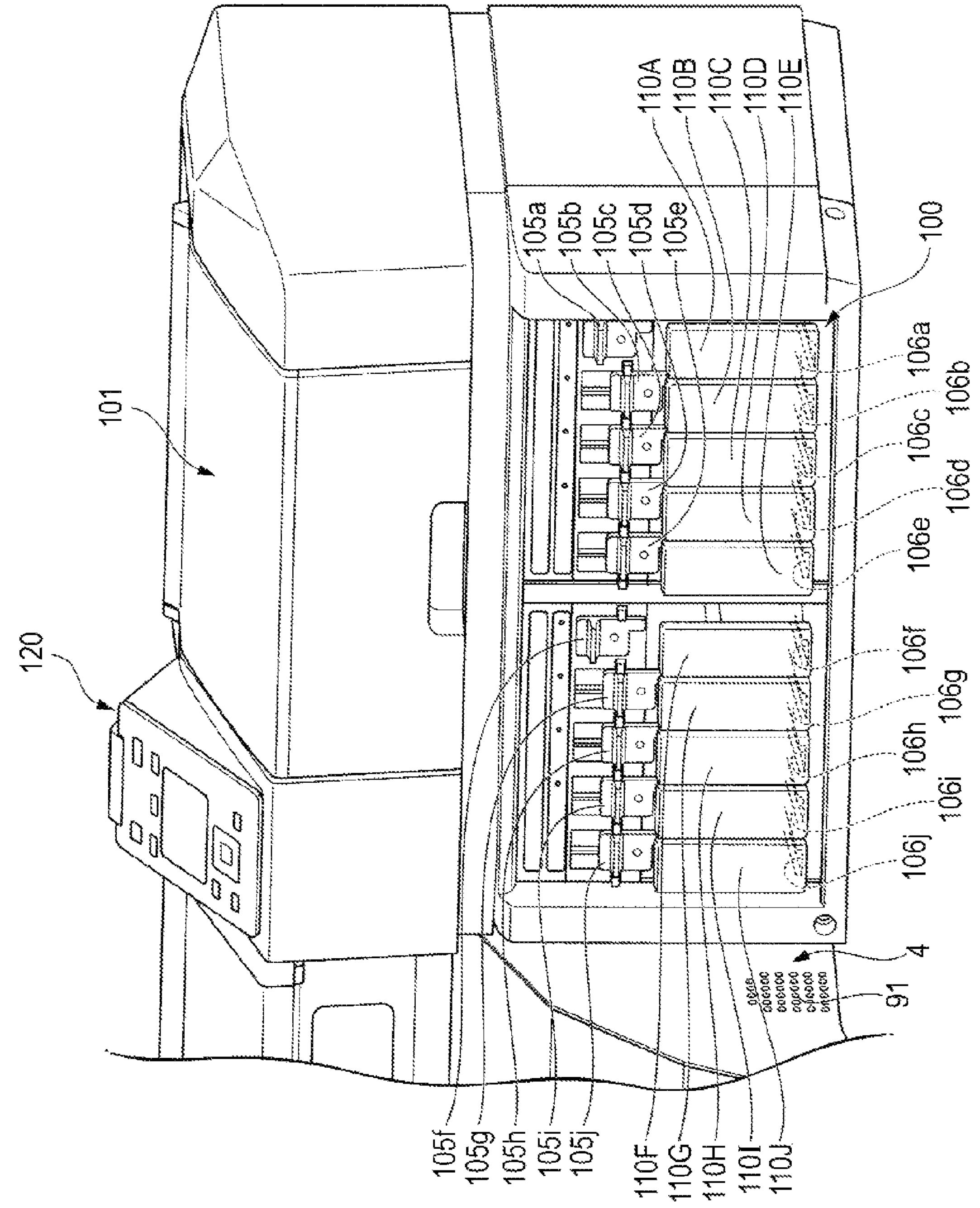
FIG. 8 is a diagram illustrating the configuration of a cartridge holding unit according to a variation.

Note that a unit that holds, for example, ten ink cartridges 110A to 110J can be used as the cartridge holding unit 100 as needed, as shown in FIG. 8. Even in such a configuration, as shown in FIG. 8, the ink cartridges 110A to 110J can be inserted/removed via engagement portions 105*a* to 105*j*, and guide grooves 106*a* to 106*j* are formed in the cartridge holding unit 100 in the same manner as the embodiment described above.

Incidentally, in this embodiment, the cartridge holding unit 100 is disposed in the vicinity of the heating unit 4 in order to achieve a reduction in the layout space of the printer 1. Accordingly, there is a risk that the temperature of the ink held within the cartridges will change due to the ink cartridges 110A to 110D held within the cartridge holding unit 100 being indirectly heated by the heating unit 4. Meanwhile, with a structure in which the ten ink cartridges 110A to 110J can be inserted into/removed from the cartridge holding unit 100, the ink cartridge 110J that is closest to the heating unit 4 is in the vicinity of the radiation source (the heating unit 4), and thus there is the risk that a large difference in temperature will occur compared to the ink cartridge 110A located on the outer side.

If such variations in temperature occur among the ink cartridges 110A to 110D, the amounts of ink ejected from the ink jet head 31 will become unstable, which leads to a problem in that the printing quality will drop.

In response to this, the printer 1 according to this embodiment causes air to flow in the vicinity of the ink cartridges 110A to 110D (or the ink cartridges 110A to 110J) that are mounted in the cartridge holding unit 100, which prevents a rise in the temperature of the ink cartridges 110A to 110D (or the ink cartridges 110A to 110J) caused by the heating unit 4.

In this embodiment, the force with which the suction fan 92 of the suction/exhaust mechanism 90 provided in order to cool the heater control board 70 sucks the exterior air via the air suction port 91 is used to suck the surrounding atmosphere of the ink cartridges 110A to 110D (or ink cartridges 110A to 110J) mounted in the cartridge holding unit 100. This will be described in greater detail later.

Returning to FIG. 1, the heater 42*a* (a radiant heating unit) shown in FIG. 1 is provided in a location that opposes the support surface 50 of the first support member 51. The heater 42*a* is an infrared heater, and is provided at a predetermined distance from the support surface 50 and extending along the width direction of the first support member 51. Accordingly, the heater 42*a* is configured so as to perform radiant heating of the first support member 51 by emitting infrared energy directly onto the support surface 50, and in the case where the medium M is supported on the support surface 50, perform direct radiant heating of the recording surface side of the medium M.

The heater 42*a* is configured so as to emit electromagnetic waves having a wavelength that includes a region in which the primary part of the radiation spectrum peak is 2 μm to 4 μm. Accordingly, the heater 42*a* can excite the water molecules contained in the ink and prompt quick drying using the resulting friction heat, without causing a significant rise in the temperature of the surrounding constituent elements that do not contain water molecules. Therefore, it is possible to cause a major part of the infrared energy to be absorbed by the ink, and the ink that has landed on the recording surface can be heated in a more concentrated manner than the medium M.

The ink jet head (recording head) 31 is provided in a position that is opposed to the support surface 50. The ink jet head 31 is in a positional relationship so as to be between the support surface 50 and the heater 42*a*, and is installed in the carriage 32 so as to move back and forth in the width direction therebetween. Accordingly, a nozzle plate, which serves as an ink ejection portion of the ink jet head 31, is not irradiated with the infrared energy, and thus the hardening/sticking of ink at the nozzle areas can be suppressed. Note that because the carriage 32 is irradiated with the infrared energy, providing an insulative material or the like can be taken as a measure against heat.

Next, operations of the printer 1 according to this embodiment will be described.

When a job instruction to commence printing is inputted, the printer 1 drives the transport unit 2 and moves the medium M to the recording unit 3. At this time, the heater control board 70 drives the heater 41*a* in the pre-heater unit 41. As a result, the temperature of the medium M on the support surface 50 of the pre-heater unit 41 gradually rises from the normal temperature toward the target temperature (the temperature of the platen heater unit 42). At the second support member 53, radiant heating is carried out by the heater 41*a* provided on the surface 52*a* opposite to the support surface 52, and thus the support surface 52 is heated by the heater 41*a*.

Meanwhile, the heater control board 70 drives the heater 42*a* of the platen heater unit 42 along with the pre-heater unit 41. Through this, the temperature of the first support member 51 rises from the normal temperature to a predetermined temperature (for example, 40° C., in this embodiment). At the first support member 51, radiant heating is carried out by the heater 42*a* provided on the surface 50*a* opposite to the support surface 50, and thus the support surface 50 is heated by the heater 42*a*.

Because the medium M is heated to the predetermined temperature (40° C.) by the pre-heater unit 41, the medium M is transported to the first support member 51 having been kept at the predetermined temperature. As a result, it is possible to prompt the quick drying of the ink that has landed on the medium M.

The printer 1 commences printing using the ink jet head 31 when the medium M is transported to a printing region on the support surface 50. At this time, the support surface 50 is covered by the medium M, and thus it is difficult for the first support member 51 to receive the heat produced by the heater 42*a*; however, a constant temperature is maintained by receiving the heat produced by the heater 42*a*.

The ink jet head 31 is installed in the carriage 32, and prints while moving back and forth in the width direction. Because the heater 42*a* is provided across the width direction above the carriage 32, when the carriage 32 recedes from an ink landing region, that ink landing region undergoes direct radiant heating at a wavelength that includes a region in which the primary part of the radiation spectrum peak is 2 μm to 4 μm. When this occurs, the water molecules contained in the ink that has landed are excited, and the friction heat produced thereby prompts evaporation/drying; the ink is thus fixed on the medium M without bleeding or the like occurring.

When a job instruction to end printing is inputted, the driving of the heating source in the platen heater unit 42 (heaters 42*a* and 42*a*) is stopped, and the temperature of the first support member 51 drops from the predetermined temperature to the normal temperature.

After the printing process has ended, the medium M is transported by the transport unit 2 along the support surface 54 of the after-heater unit 43. At this time, the heater control board 70 drives the heater 43*a* in the after-heater unit 43. At the third support member 55, radiant heating is carried out by the heater 43*a* provided on the surface 54*a* opposite to the support surface 54, and thus the support surface 54 is heated by the heater 43*a*. Through this, the temperature of the medium M upon the support surface 54 of the after-heater unit 43 rises from the normal temperature to the target temperature (50° C.).

By driving the tension roller 25, the printer 1 imparts tension on the medium M that has been heated by the after-heater unit 43, which makes it possible to prevent thermal stretching in the medium M appearing as twisting in the central area in the width direction thereof that results in wrinkles.

After the medium M has been imparted with tension by the tension roller 25, the medium M is taken up by the roll 22.

Incidentally, the printer 1 according to this embodiment has the heater control board 70 that controls the driving of the heating unit 4 provided inside the heating unit 4, which miniaturizes the printer 1 itself by reducing the space required for the installation of the heater control board 70.

There is a risk that the heater control board 70 disposed within the heating unit 4 in this manner will be susceptible to the influence of radiant heat from the heaters 41*a*, 42*a*, and 43*a* of the heating unit 4. In response to this, the printer 1 according to the embodiment houses the heater control board 70 within the housing space K defined by the partition plate 61 provided within the box-shaped portion 4A that forms the outer shape of the heating unit 4 and the main body unit 60. Because the housing space K is configured by the main body unit 60 and the partition plate 61, which are different entities than the first support member 51, the second support member 53, and the third support member 55 in which the heaters 41*a*, 42*a*, and 43*a* are provided, the influence of the heaters 41*a*, 42*a*, and 43*a* on the heater control board 70 can be reduced.

Meanwhile, in order to drive the heating unit 4 in a stable manner, the printer 1 according to this embodiment prevents the temperature of the heater control board 70 that controls the driving of the heaters 41*a*, 42*a*, and 43*a* from rising. The printer 1 drives the suction fan 92 of the suction/exhaust mechanism 90 at the same time as the pre-heater unit 41 is driven. By driving the suction fan 92, the suction/exhaust mechanism 90 can suck air from the exterior into the housing space K via the air suction port 91. The air supplied from the air suction port 91 to the interior of the housing space K makes contact with the heat dissipation members 71 provided on the heater control board 70, is led downward by colliding with the connection portion 61*c* of the partition plate 61, and is exhausted from the air exhaust port 93.

Because exterior air is brought into contact with the heat dissipation members 71 in this manner, the heater control board 70 on which the heat dissipation members 71 are provided can be indirectly cooled. In this embodiment, the plurality of fins 71*a* that configure the finned structure in each heat dissipation member 71 are disposed following the direction orthogonal to the direction in which the exterior air (gas) taken in from the air suction port 91 flows, and thus the exterior air taken in from the air suction port 91 can easily pass between the plurality of fins 71*a*. In addition, as described above, the connection portion 61*c* provided in the partition plate 61 can improve the efficiency at which the air is exhausted from the air exhaust port 93.

In addition, when the suction fan 92 of the suction/exhaust mechanism 90 is driven, the surrounding atmosphere of the ink cartridges 110A to 110D (or the ink cartridges 110A to 110J) is sucked. Here, the "surrounding atmosphere" includes the air on the front surface side of the ink cartridges 110A to 110D (or the ink cartridges 110A to 110J) and the space between the ink cartridges 110A to 110D (or the ink cartridges 110A to 110J) and the cartridge holding unit 100.

When air flow is produced in the periphery of the ink cartridges 110A to 110D (or the ink cartridges 110A to 110J) in this manner, the air heated by the radiant heat from the heating unit 4 is prevented from building up around the ink cartridges 110A to 110D (or the ink cartridges 110A to 110J). Accordingly, it is possible to prevent the occurrence of a problem where the temperature of the ink within the ink cartridges 110A to 110D (or the ink cartridges 110A to 110J) rises due to the cartridges being indirectly heated.

In addition, as mentioned above, gaps between the ink cartridges 110A to 110D (or the ink cartridges 110A to 110J) housed in the cartridge holding unit 100 are produced by the guide grooves 106*a* to 106*d*, and the gaps communicate with the surrounding region of the air suction port 91.

Accordingly, when the suction fan 92 sucks the surrounding atmosphere of the ink cartridges 110A to 110D (or the ink cartridges 110A to 110J), the air within the guide grooves 106*a* to 106*d* (or the guide grooves 106*a* to 106*j*) is also sucked into the air suction port 91. Here, the guide grooves 106*a* to 106*d* (or the guide grooves 106*a* to 106*j*) are formed following the insertion/removal direction of the cartridges for the cartridge holding unit 100, and thus an air flow can be produced along the depth direction of the cartridges.

Figure 9A:
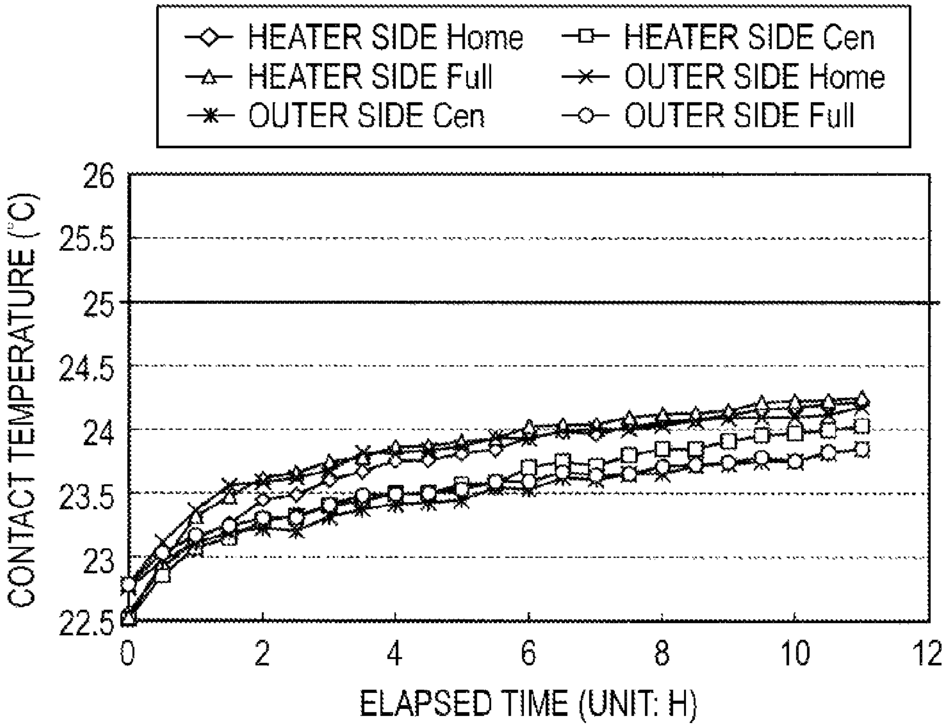
FIGS. 9A and 9B are graphs illustrating effects of an embodiment of the invention.
Figure 9B:
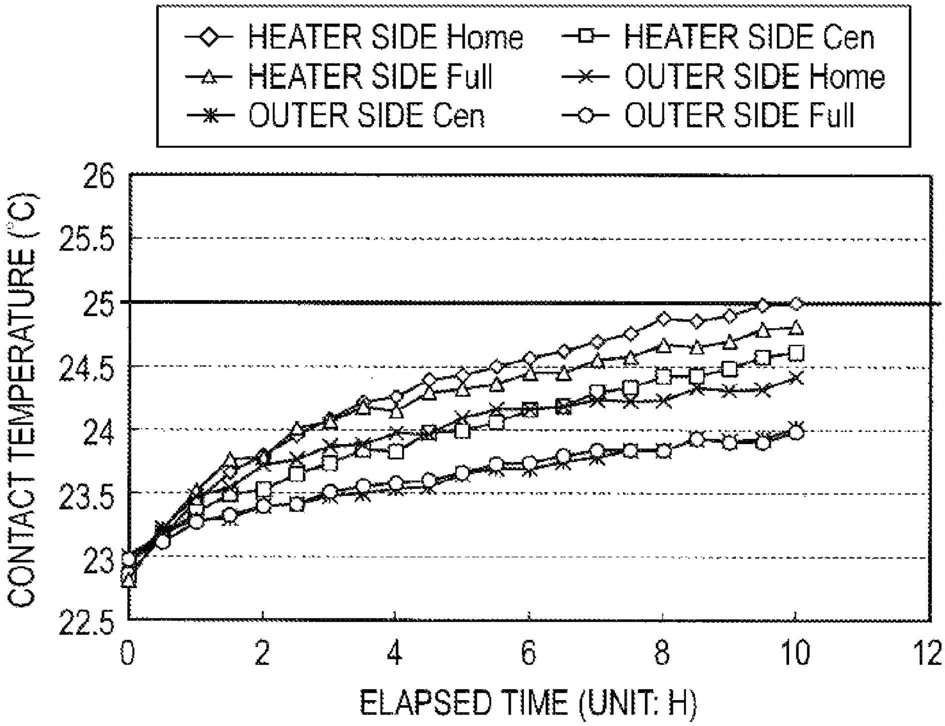

Next, effects of sucking the surrounding atmosphere of the ink cartridges 110A to 110D will be described. FIGS. 9A and 9B are graphs illustrating effects of this embodiment (in the case where the cartridge holding unit 100 holds ten ink cartridges), where FIG. 9A illustrates a change in the temperature of the ink cartridges in the case where the surrounding atmosphere is sucked by the suction fan 92 (that is, the case where an air flow is produced), and FIG. 9B illustrates a change in the temperature of the ink cartridges in the case where the surrounding atmosphere is not sucked by the suction fan 92 (that is, the case where no air flow is produced).

Figure 10:
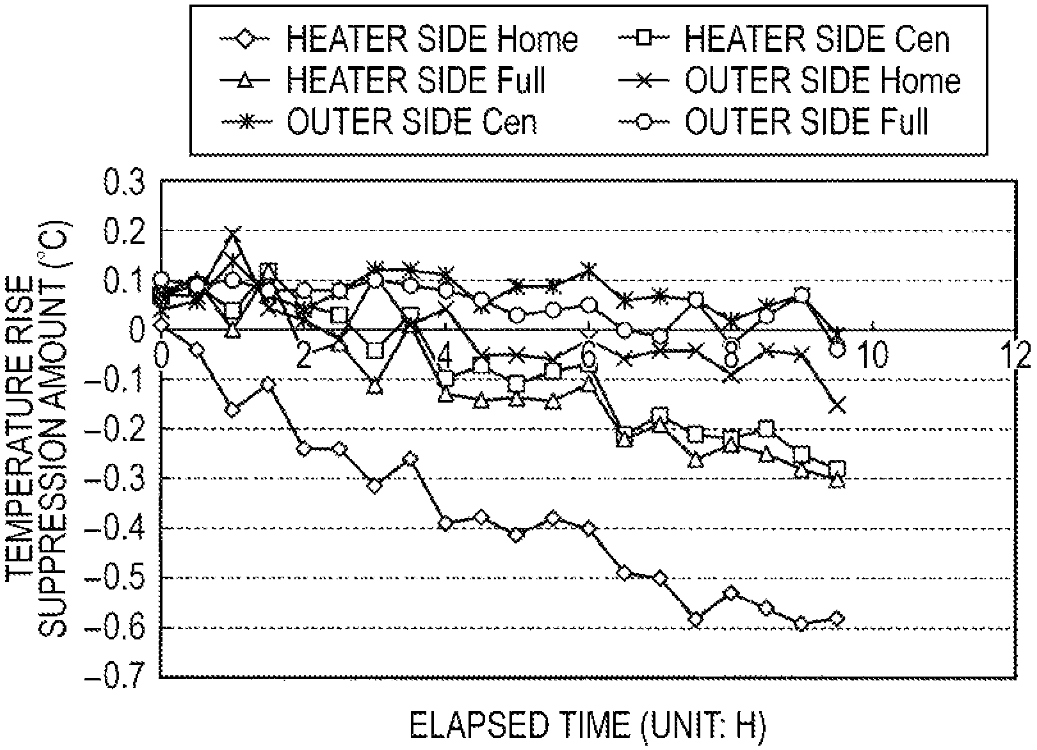
FIG. 10 is a graph illustrating effects of an embodiment of the invention.

Meanwhile, FIG. 10 is a graph illustrating an ink cartridge temperature change suppression effect in the case where an air flow is produced. Note that the vertical axis represents a temperature change amount (unit: ° C.), whereas the horizontal axis represents elapsed time (unit: H).

Note that in each drawing, the vertical axis represents a temperature (unit: ° C.), whereas the horizontal axis represents elapsed time (unit: H). Furthermore, "heater side Home", "heater side Cen", and "heater side Full" indicate the locations of predetermined cartridges in the ink cartridges 110A to 110J. Specifically, heater side Full corresponds to the ink cartridge 110J that, of the five ink cartridges 110F to 110J disposed toward the heating unit 4, is disposed closest to the heating unit 4; heater side Home corresponds to the ink cartridge 110F that, of the ink cartridges 110F to 110J, is disposed furthest from the heating unit 4; and heater side Cen corresponds to the middle of the ink cartridges 110F to 110J, or in other words, to the ink cartridge 110H. Meanwhile, outer side Full corresponds to the ink cartridge 110E that, of the five ink cartridges 110A to 110E disposed away from the heating unit 4, is disposed furthest toward the heating unit 4; outer side Home corresponds to the ink cartridge 110A that, of the ink cartridges 110A to 110E, is disposed furthest from the heating unit 4; and outer side Cen corresponds to the middle of the ink cartridges 110A to 110E, or in other words, to the ink cartridge 110C.

As shown in FIG. 9B, the influence of the radiant heat is great when a cartridge is near the heating unit 4, and thus the temperature of the ink cartridge 110J experiences a large change; conversely, the influence of the radiant heat is small when a cartridge is far from the heating unit 4, and thus the temperature of the ink cartridge 110A experiences only a small change. Specifically, it has been confirmed that when ten hours have passed following the commencement of driving of the printer 1, a maximum temperature variation of approximately 1.02° C. arises among the ink cartridges 110A to 110J.

As opposed to this, in this embodiment, in which suction is carried out by the suction fan 92, it has been confirmed that even if 11 hours have passed following the commencement of driving the printer 1, the temperature variation among the ink cartridges 110A to 110J can be kept within approximately 0.41° C., as shown in FIG. 9A. It has been confirmed that through this, the air flow produced in the surrounding regions of the ink cartridges 110A to 110J achieves an effect of suppressing a rise in the temperatures of the ink cartridges 110A to 110J. As shown in FIG. 10, it has been confirmed that at most, the rise in the temperature of the ink cartridge 110F (heater side Home) can be suppressed to 0.6° C.

As described thus far, according to this embodiment, driving the suction fan 92 of the suction/exhaust mechanism 90 makes it possible to suck the air in the surrounding areas of the ink cartridges 110A to 110D (or the ink cartridges 110A to 110J) and in the guide grooves 106*a* to 106*d* (or the guide grooves 106*a* to 106*j*). Accordingly, a rise in the temperatures of the ink cartridges 110A to 110D (or the ink cartridges 110A to 110J) can be efficiently prevented. Through this, temperature differences arising among the ink cartridges 110A to 110D (or the ink cartridges 110A to 110J) can be reduced. This in turn makes it possible to prevent the occurrence of a problem in which variations arise in the viscosity of the ink due to variations in the temperatures among the ink cartridges 110A to 110D, leading to instability in the amounts of ink ejected from the ink jet head 31 and a resulting drop in the print quality.

Furthermore, this embodiment employs a configuration in which the surrounding atmosphere of the ink cartridges 110A to 110D (or the ink cartridges 110A to 110J) is sucked using the suction fan 92 of the suction/exhaust mechanism 90, which is required in order to cool the heater control board 70 that is disposed in the housing space K within the box-shaped portion 4A of the heating unit 4. Accordingly, components can be shared, which suppresses an increase in the number of components used to configure the printer 1, and makes it possible to realize a reduction in costs.

Furthermore, because the heater control board 70 is provided within the heating unit 4 (the box-shaped portion 4A), the space required for installing the heater control board 70 can be reduced, which makes it possible to miniaturize the printer 1 itself.

Furthermore, because the heater control board 70 and the heaters 41*a*, 42*a*, and 43*a* are disposed near each other, the layout of the wires 70*b* that connect the heater control board 70 and the heaters 41*a*, 42*a*, and 43*a* can be simplified.

In addition, the housing space K that houses the heater control board 70 is configured of surfaces that do not include the support surfaces 50, 52, and 54 that are heated by the heaters 41*a*, 42*a*, and 43*a*, and thus the heater control board 70 is not directly exposed to heat.

In addition, the suction/exhaust mechanism 90 cools the heater control board 70 using the exterior air taken into the housing space K, and the air heated as a result of cooling the heater control board 70 can be exhausted from the air exhaust port 93, which makes it possible to efficiently cool the heater control board 70. Accordingly, employing a configuration in which the heater control board 70 is provided within the heating unit 4 while also avoiding a rise in the temperature of the heater control board 70 makes it possible to simplify the layout of the wires 70*b* and miniaturize the printer 1.

Furthermore, in the printer 1, the after-heater unit 43 can be removed from the main body unit 60 and the partition plate 61 can be removed from the main body unit 60, and thus the user can easily access the heater control board 70 from the front surface side of the printer 1 during maintenance by removing the after-heater unit 43 and the partition plate 61 in that order. Accordingly, a printer 1 having superior maintainability can be provided.

Although an exemplary embodiment of the invention has been described thus far with reference to the drawings, the invention is not intended to be limited to the aforementioned embodiment. The forms, combinations, and so on of the various constituent elements illustrated in the aforementioned embodiment are merely exemplary, and many variations based on design requirements and the like are possible without departing from the essential spirit of the invention.

The plate-shaped member erected on the side surface of the main body unit 60 may be formed so that the air suction port 91 is disposed between the plate-shaped member and the cartridge holding unit 100. According to this configuration, the surrounding atmosphere of the ink cartridges 110A to 110J can be efficiently sucked, which makes it possible to produce an air flow efficiently in the periphery of the ink cartridges 110A to 110J. Accordingly, a rise in the temperatures of the ink cartridges 110A to 110J can be efficiently prevented.

In addition, although the suction/exhaust mechanism 90 has been described as taking the exterior air into the housing space K from the air suction port 91 provided in a side surface of the main body unit 60 and exhausting the air from the air exhaust port 93 provided in the bottom surface 60*a* of the main body unit 60, the invention is not limited thereto. For example, the configuration may be such that the air suction port 91 is provided in the bottom surface 60*a* of the main body unit 60 and the air exhaust port 93 is formed in a side surface of the main body unit 60.

In addition, although the aforementioned embodiment describes an example in which the recording apparatus is the printer 1, the recording apparatus is not limited to a printer, and may instead be a device such as a copier, a facsimile machine, or the like.

Furthermore, a recording apparatus that ejects and discharges a fluid aside from ink may be employed as the recording apparatus. The invention can be applied, for example, in various types of recording apparatuses provided with recording heads that eject extremely small-volume liquid droplets. Note that "droplet" refers to the state of the liquid ejected from the recording apparatus, and is intended to include granule forms, teardrop forms, and forms that pull tails in a string-like form therebehind. Furthermore, the "liquid" referred to here can be any material capable of being ejected by the recording apparatus. For example, any matter can be used as long as the matter is in its liquid state, including liquid state matter having high or low viscosity; fluid states such as sol, gel water, other inorganic agents, organic agents, liquid solutions, liquid resins, liquid metals (metallic melts); furthermore, in addition to liquids as a single state of a matter, liquids in which the molecules of a functional material composed of a solid matter such as pigments, metal particles, or the like are dissolved, dispersed, or mixed in a liquid carrier. Ink, described in the above embodiment as a representative example of a liquid, can be given as an example. Here, "ink" generally includes water-based and oil-based inks, as well as various types of liquid compositions, including gel inks, hot-melt inks, and so on. Furthermore, in addition to a plastic film such as vinyl chloride film, paper, high-performance paper, circuit boards, metal plates, and so on are included as the recording medium.

The entire disclosure of Japanese Patent Application No. 2011-159631, filed Jul. 21, 2011 is expressly incorporated by reference herein.

What is claimed is:

1. A recording apparatus comprising:

a holding unit that holds a liquid receptacle containing a liquid;

a recording head that ejects, onto a recording medium, the liquid supplied from the liquid receptacle held by the holding unit;

a heating unit that heats the recording medium;

a control unit that controls the heater, wherein the control unit is housed in the heating unit; and a suction unit that includes a suction port for sucking air into the heating unit, wherein the suction port is disposed in a location that exposes the suction port to air that is external to the recording apparatus and enables the atmosphere around the liquid receptacle to be sucked, wherein the holding unit is disposed upstream of the suction unit in an air flow path, wherein the control unit is disposed downstream of the suction unit in the air flow path.

2. The recording apparatus according to claim 1, wherein the heating unit includes a box-shaped portion, and the suction port is located in a surface of the box-shaped portion that is close to the holding unit.

3. The recording apparatus according to claim 2, wherein the holding unit includes, in a side surface of the holding unit, an opening portion that enables the liquid receptacle to be inserted into/removed from the holding unit; and the suction port is disposed in a side surface of the box-shaped portion that is close to an opening portion.

4. The recording apparatus according to claim 2, wherein the heating unit heats the recording medium that has been transported from upstream and onto which the liquid has been ejected by the recording head; and the holding unit is disposed to the side of the heating unit in the direction orthogonal to the direction in which the recording medium is transported.

5. The recording apparatus according to claim 1, wherein the holding unit is located in the recording apparatus at a distance that is far from the heating unit in a moving direction of the recording ejecting head.

6. A recording apparatus according to claim 1, wherein the control unit includes a heater control board.

7. A recording apparatus according to claim 6, wherein the heating unit includes, a main body;

a support member that is connected to the main body and supports the recording medium;

a heater that heats the support member; and a partition plate that is disposed in the heating unit, wherein the heater control board is housed in a housing space that is formed by the main body and the partition plate in the heating unit.

8. A recording apparatus according to claim 7, wherein the suction port is formed in a side frame of the main body.

9. A recording apparatus according to claim 7, wherein the heater is housed in the heating unit, the partition plate located between the heater and the heater control board.

10. A recording apparatus claim 1, wherein the heating unit includes a first heater unit located upstream from the recording head, a second heater unit opposing the recording head, and a third heater unit downstream from the recording head, wherein air sucked by the suction unit is provided into the third heater unit.

11. A recording apparatus comprising:

a holding unit that holds a liquid receptacle containing a liquid;

a recording head that ejects, onto a recording medium, the liquid supplied from the liquid receptacle held by the holding unit;

a heating unit that heats the recording medium; and a suction unit that includes a suction port for sucking air into the heating unit, wherein the suction port is disposed in a location that exposes the suction port to air that is external to the recording apparatus and enables the atmosphere around the liquid receptacle to be sucked, wherein the holding unit is disposed upstream of the suction unit in an air flow path, wherein the heating unit includes a box-shaped portion, and the suction port is located in a surface of the box-shaped portion that is close to the holding unit, wherein the holding unit includes, in a side surface of the holding unit, an opening portion that enables the liquid receptacle to be inserted into/removed from the holding head; and the holding unit is disposed to the side of the heating unit in the direction orthogonal to the direction in which the recording medium is transported.

12. A recording apparatus comprising:

a holding unit that holds a liquid receptacle containing a liquid;

a recording head that ejects, onto a recording medium, the liquid supplied from the liquid receptacle held by the holding unit;

a heating unit that heats the recording medium; and a suction unit that includes a suction port for sucking air into the heating unit, wherein the suction port is disposed in a location that exposes the suction port to air that is external to the recording apparatus and enables the atmosphere around the liquid receptacle to be sucked, wherein the holding unit is disposed upstream of the suction unit in an air flow path, wherein the heating unit includes a first heater unit located upstream from the recording head, a second heater unit opposing the recording head, and a third heater unit downstream from the recording head, wherein air sucked by the suction unit is provided into the third heater unit.

* * * * *